United States Patent
Park et al.

(10) Patent No.: US 7,936,987 B2
(45) Date of Patent: May 3, 2011

(54) METHOD AND APPARATUS FOR AUTO FOCUSING

(75) Inventors: Byung-Kwan Park, Seoul (KR); Byung-Ho Kang, Daejeon (KR)

(73) Assignees: Samsung Electronics Co., Ltd., Suwon-Si (KR); Samsung Electro-Mechanics Co., Ltd., Suwon (KR)

( * ) Notice: Subject to any disclaimer, the term of this patent is extended or adjusted under 35 U.S.C. 154(b) by 160 days.

(21) Appl. No.: 12/222,117

(22) Filed: Aug. 1, 2008

(65) Prior Publication Data

US 2009/0074393 A1 Mar. 19, 2009

(30) Foreign Application Priority Data

Sep. 14, 2007 (KR) .................. 10-2007-0093743

(51) Int. Cl.
G03B 3/00 (2006.01)
G03B 13/00 (2006.01)
(52) U.S. Cl. ........................... 396/104; 348/348
(58) Field of Classification Search .............. 396/79, 396/80, 82, 89, 104; 348/345, 348; 359/698
See application file for complete search history.

(56) References Cited

U.S. PATENT DOCUMENTS

| 4,965,443 | A | * | 10/1990 | Yamasaki et al. | 396/89 |
| 2004/0046885 | A1 | * | 3/2004 | Regan et al. | 348/333.11 |
| 2007/0036427 | A1 | * | 2/2007 | Nakamura et al. | 382/154 |

FOREIGN PATENT DOCUMENTS

| JP | 05-199444 | 8/1993 |
| JP | 08-054556 | 2/1996 |
| JP | 08-54557 | 2/1996 |
| JP | 2000-171682 | 6/2000 |
| KR | 10-1994-0032419 | 12/1994 |

* cited by examiner

*Primary Examiner* — Clayton E Laballe
*Assistant Examiner* — Autumn Parker
(74) *Attorney, Agent, or Firm* — Staas & Halsey LLP

(57) ABSTRACT

A method and apparatus to auto focus are provided. A distance classifier to auto focus includes a distance-calculating module calculating a focal distance on the basis of blur levels of at least two images; a precise distance-calculating module calculating the exact distance to a subject when an image that is captured at the focal distance calculated by the distance-calculating module is out of focus; and a distance-calculation-correcting module correcting the distance-calculating module on the basis of the blur levels and the exact distance to the subject that is calculated by the precise distance-calculating module.

25 Claims, 9 Drawing Sheets

METHOD AND APPARATUS FOR AUTO FOCUSING

CROSS-REFERENCE TO RELATED APPLICATIONS

This application claims priority from Korean Patent Application No. 10-2007-0093743 filed on Sep. 14, 2007 in the Korean Intellectual Property Office, the disclosure of which is incorporated herein by reference in its entirety.

BACKGROUND

1. Field

The present invention relates to a method and an apparatus for auto focusing, and, more particularly, to a method and apparatus for auto focusing that calculates the focal distance on the basis of a blur level of an image and corrects a method of calculating the focal distance when an image that is captured at the calculated focal distance is out of focus.

2. Description of the Related Art

Efforts have been made to improve the quality of images in image-capturing apparatuses, such as digital cameras and digital camcorders, which are widely used, by using an auto focusing function.

In general, the image-capturing apparatus, such as a camcorder or a camera, performs photoelectric conversion, that is, converts optical signals that are incident on a lens into electric signals, and performs predetermined image processing on the converted image signals to form an image.

Auto focus and a manual focusing are methods of adjusting the focus of the image-capturing apparatus. According to auto focusing technology, a subject is detected using image signals of the subject that is captured by a lens, and a focal lens is automatically driven according to the subject, such that the focus of the image-capturing device is automatically adjusted.

In order to adjust the focus of the image-capturing apparatus, in general, the focal lens is moved to capture an image that is in complete focus. In this case, images that are out of focus need to be captured, which requires a lot of time, leading to shutter lag.

In order to solve this problem, methods of finding the position of a focal lens where an image is in focus by using two or three images that are out of focus have been proposed.

According to most of the methods, image data is acquired from the images that are captured at different distances, data to determine the position of the focal lens is obtained from the acquired image data, and the obtained data is stored in an image-capturing apparatus in the form of a look up table (LUT).

In a method of storing data in the form of a look up table (LUT), which is used to determine the position of the focal lens, in the image-capturing apparatus as the auto focusing method for the image-capturing apparatus, it is difficult to store all of data in the form of a LUT. As a result, if data that is not included in the LUT stored in the image-capturing apparatus is input, an error occurs.

SUMMARY

Accordingly, it is an aspect of the present invention to provide an apparatus and method of auto focusing that can quickly adjust the focus by using two images, and perform self-correction when out of focus.

Another aspect of the present invention is to provide an apparatus and method of auto focusing that calculates the focal distance on the basis of blur levels of images and corrects a method of calculating the focal distance when an image that is captured at the calculated focal lens is out of focus.

Additional aspects and/or advantages will be set forth in part in the description which follows and, in part, will be apparent from the description, or may be learned by practice of the invention.

The foregoing and/or other aspects of the present invention are achieved by providing a distance classifier to auto focus comprising a distance-calculating module calculating a focal distance on the basis of blur levels of at least two images; a precise distance-calculating module calculating an exact distance to a subject when one of the images is captured at the focal distance calculated by the distance-calculating module is out of focus; and a distance-calculation-correcting module correcting the distance-calculating module on the basis of the blur levels and the exact distance to the subject that is calculated by the precise distance-calculating module.

The foregoing and/or other aspects of the present invention are also achieved by providing an apparatus to auto focus comprising a blur-level-calculating module calculating blur levels of at least two images that have different focal distances; a distance-calculating module calculating the focal distances on the basis of the blur levels that are calculated by the blur-level-calculating module; a precise distance-calculating module calculating the exact distance to a subject when one of the images is captured at one of the focal distances calculated by the distance-calculating module is out of focus; and a distance-calculation-correcting module correcting the distance-calculating module on the basis of the blur levels and the exact distance to the subject that is calculated by the precision distance-calculating module.

The foregoing and/or other aspects of the present invention are also achieved by providing an image-capturing apparatus comprising a lens on which image light of a subject is incident; a sensor capturing an image formed by the incident image light; an auto focusing apparatus calculating a focal distance by calculating a blur level of the image captured by the sensor, and correcting a method of calculating the focal distance when the image captured at the calculated focal distance is out of focus; a focal lens controller positioning the lens to adjust the focal distance according to the focal distance that is calculated by the auto focusing apparatus; and an image processor processing the image at the adjusted focal distance to form a final image.

The foregoing and/or other aspects of the present invention are also achieved by providing an auto focusing method comprising calculating a blur level of a first image that is captured at a first focal distance and a blur level of a second image that is captured at a second focal distance; calculating the first and second focal distances on the basis of the blur level of the first image and the blur level of the second image; and correcting a method of calculating the focal distance when one of the captured images is out of focus.

The foregoing and/or other aspects of the present invention are also achieved by providing an image-capturing method comprising capturing images of a subject when image light is incident; calculating blur levels of the captured images; calculating a focal distance to the images on the basis of the calculated blur levels; correcting a method of calculating the focal distance when the images that is captured at the calculated focal distance is out of focus; and processing the captured image at the calculated focal distance to form a final image.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENT

Reference will now be made in detail to the embodiment, an example of which is illustrated in the accompanying drawings, wherein like reference numerals refer to the like elements throughout. The embodiment is described below to explain the present invention by referring to the figures.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations implementing the functions specified in the flowchart block or blocks.

And each block of the flowchart illustrations may represent a module, segment, or portion of code, which comprises one or more executable instructions implementing the specified logical function(s). It should also be noted that in some alternative implementations, the functions noted in the blocks may occur out of the indicated order. For example, two blocks shown in succession may in fact be executed substantially concurrently or the blocks may sometimes be executed in the reverse order, depending upon the functionality involved.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Figure 1:
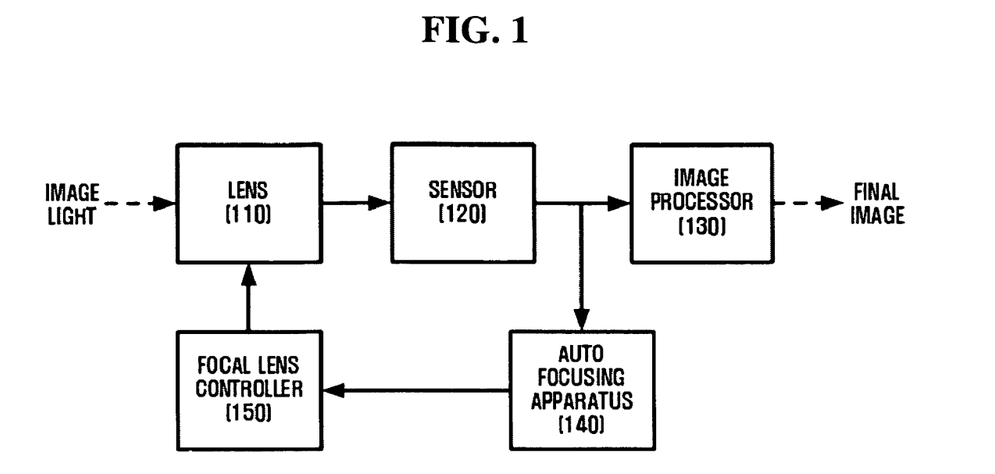
FIG. 1 is a block diagram illustrating an image-capturing apparatus provided with an auto focusing apparatus according to an embodiment of the present invention.

FIG. 1 is a block diagram illustrating an image-capturing apparatus provided with an apparatus to auto focus according to an embodiment of the present invention.

An image-capturing apparatus includes a lens 110, a sensor 120, an image processor 130, an apparatus for auto focusing (hereinafter, referred to as an "auto focusing apparatus") 140, and a focal lens controller 150.

Image light from a subject is incident on the sensor 120 through the lens 110. Examples of the sensor 120 include a CCD, a CMOS, and other image-capturing devices that are known in the art. An analog image that is formed on an imaging surface of the sensor 120 is converted into a digital image.

The image processor 130 generates a final image by applying a standard imaging algorithm to an image that is in focus. The image processor 130 performs image processing, such as removing noise from the image, highlighting edges, and compression, to form the final image.

The auto focusing apparatus 140 calculates the blur level of the image that is captured by the sensor 120, and then calculates the focal distance on the basis of the calculated blur level. The auto focusing apparatus 140 calculates the focal distance on the basis of two blur levels. When an image that is acquired on the basis of the calculated focal distance is out of focus, the method of calculating the focal distance is corrected. A detailed description thereof will be made with reference to FIG. 2.

The focal lens controller 150 positions the lens 110 according to the determined focal distance.

Figure 2:
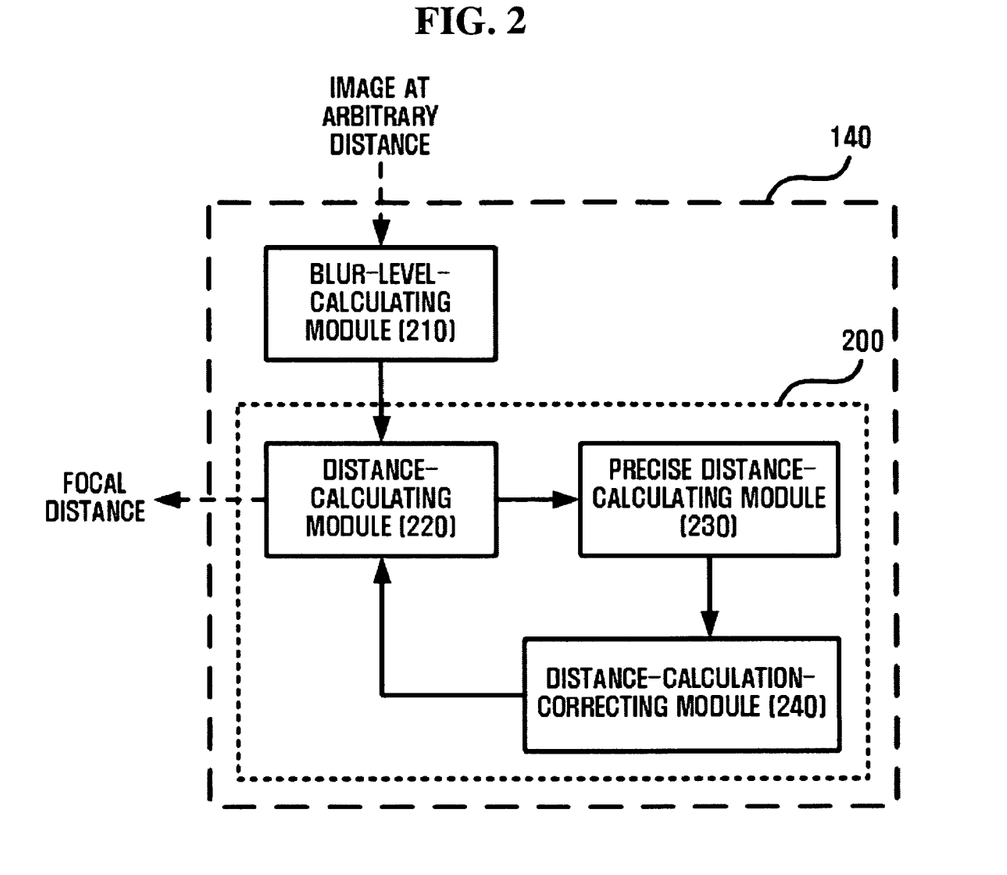
FIG. 2 is a block diagram illustrating an auto focusing apparatus according to an embodiment of the present invention.

FIG. 2 is a block diagram illustrating the auto focusing apparatus 140 according to the embodiment of the present invention.

The auto focusing apparatus 140 includes a blur-level-calculating module 210 and a distance classifier 200 that includes a distance-calculating module 220, a precise-distance-calculating module 230, and a distance-calculation-correcting module 240.

The blur-level-calculating module 210 calculates a blur level B1 of a first image I1 on the basis of a first focal distance and a blur level B2 of a second image I2 on the basis of a second focal distance. The blur level is calculated by using a transform method, such as the discrete cosine transform (DCT), Fourier transform (FT) method, or wavelet transform (WT) method, and a method using a high pass filter, such as the Laplacian filter or the Sobel filter.

The blur-level-calculating module 210 inputs the calculated blur levels B1 and B2 to the distance classifier 200 that can calculate the focal distance.

The distance classifier 200 calculates the focal distance on the basis of the calculated blur levels B1 and B2. When an image that is acquired at the calculated focal distance is out of focus, the distance classifier 200 calculates the exact distance from the subject to correct the method of calculating the focal distance. The distance classifier 200 includes the distance-calculating module 220, the precise-distance-calculating module 230, and the distance-calculation-correcting module 240.

The distance-calculating module 220 calculates the focal distance on the basis of the blur levels B1 and B2. The distance-calculating module 220 can calculate the focal distance on the basis of the blur levels according to various methods. The distance-calculating module 220 may calculate the focal distance by using a multilayer neural network. A detailed description thereof will be made later with reference to FIGS. 6 and 7.

When an image that is captured at the focal distance calculated by the distance-calculating module 220 is out of focus, the precise distance-calculating module 230 calculates the exact distance to the subject. The precise-distance-calculating module 230 calculates the exact distance to the subject by using an active auto focusing method that uses infrared rays or ultrasonic waves. Alternatively, the exact distance may be input by a user. However, in consideration of the performance and economic efficiency of the apparatus, a passive auto focusing method that is based on images captured by an image-capturing apparatus may be used. High pass filtering and a hill climbing search algorithm are representative methods. A detailed description thereof will be made later with reference to FIG. 5.

The distance-calculation-correcting module 240 corrects the distance-calculating module 220 on the basis of the exact distance to the subject that is calculated by the precise distance-calculating module 230, the blur level B1 of the first image, and the blur level B2 of the second image. When a multilayer neural network is used as the distance-calculating module 220, the distance-calculation-correcting module 240 uses an online learning method to correct coefficients of the multilayer neural network such that the distance-calculating module 220 has a minimum error. A detailed description thereof will be made later with reference to FIGS. 8 and 9.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 3:
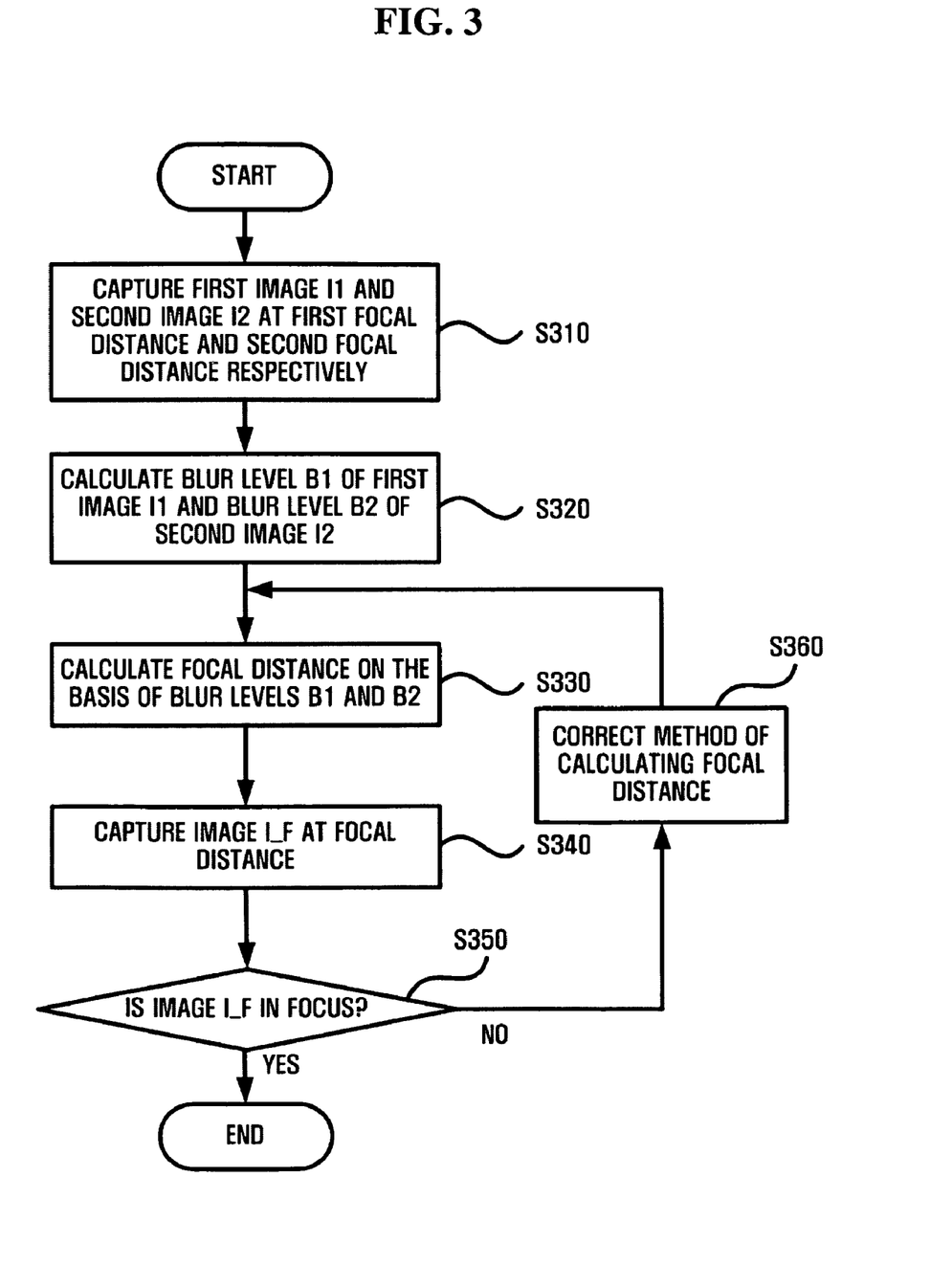
FIG. 3 is a flowchart illustrating an auto focusing method according to an embodiment of the present invention.

FIG. 3 is a flowchart illustrating an auto focusing method according to an embodiment of the invention.

The first image I1 and the second image I2 are captured at a first focal distance and a second focal distance, respectively S310. The focal lens controller 150 positions the lens 110 at a first position corresponding to the first focal distance and a second position corresponding to the second focal distance. Then, the sensor 120 captures the first image I1 and the second image I2.

The blur level B1 of the first image I1 and the blur level B2 of the second image I2 are calculated S320. The blur-level-calculating module 210 of the auto focusing apparatus 140 calculates the blur level B1 of the first image I1 and the blur level B2 of the second image I2 by using a transform method, such as the discrete cosine transform (DCT), Fourier transform (FT), or wavelet transform (WT) or by using a high pass filter, such as the Laplacian filter or the Sobel filter.

The focal distance is calculated on the basis of the blur level B1 of the first image and the blur level B2 of the second image S330. The distance-calculating module 220 of the auto focusing apparatus 140 can calculate the focal distance on the basis of blur levels by using various kinds of methods. For example, the distance-calculating module 220 calculates the focal distance by using a multilayer neural network (MNN). A detailed description thereof will be made later with reference to FIGS. 6 and 7.

An image I_F is captured at the calculated focal distance S340. The focal lens controller 150 positions the lens 110 according to the calculated focal distance, and the sensor 120 captures an image.

It is determined whether the captured image I_F is in focus or out of focus S350. The user may be asked whether the acquired image I_F is in focus or out of focus. Alternatively, the determination may be made according to a predetermined standard. When it is determined that the acquired image I_F is in focus, the image processor 130 performs image processing, such as applying a standard imaging algorithm, removing noise, highlighting edges, and compression, to form the final image.

When it is determined that the acquired image I_F is out of focus, the method of calculating the focal distance is corrected S360. A detailed description thereof will be made below with reference to FIG. 4.

According to the corrected method of calculating the focal distance, the focal distance is calculated again on the basis of the blur level B1 of the first image and the blur level B2 of the second image S330. The processes are repeated until an image in focus is obtained.

Figure 4:
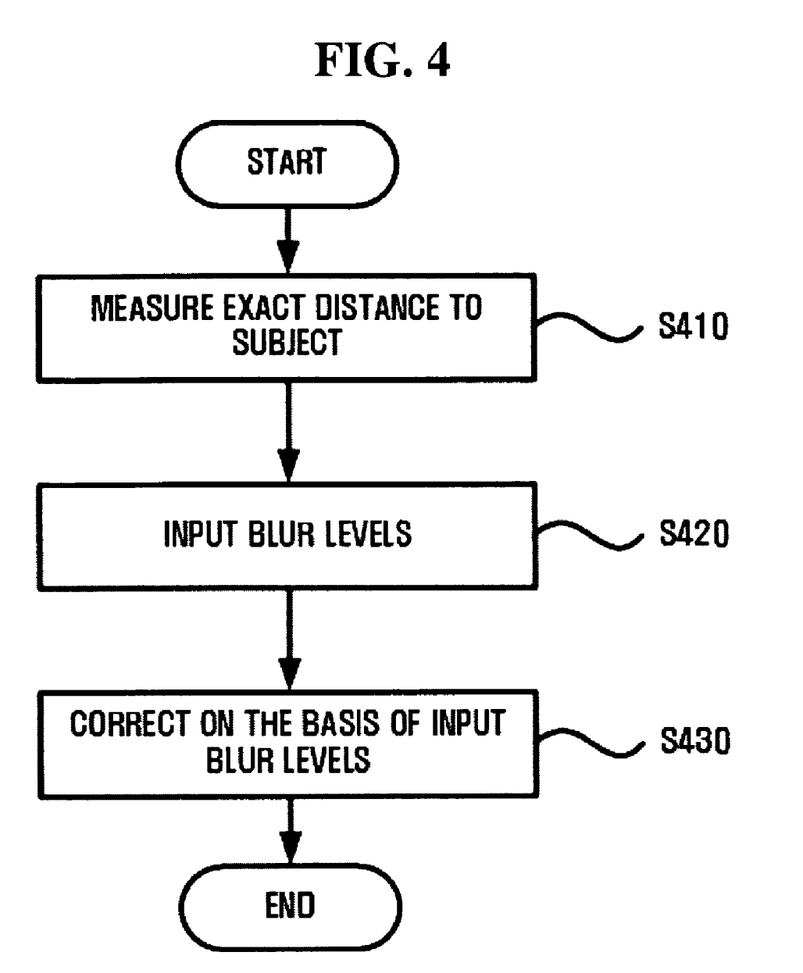
FIG. 4 is a flowchart illustrating a process of correcting a method of calculating the focal distance in the auto focusing method according to the embodiment of the present invention.

FIG. 4 is a flowchart illustrating a process of correcting the focal distance calculating method in the auto focusing method according to the embodiment of the present invention.

The exact distance to the subject is calculated S410. When the image I_F that is captured at the focal distance calculated by the distance-calculating module 220 is out of focus, the precise distance-calculating module 230 calculates the exact distance to the subject S410. The precise distance-calculating module 230 may calculate the exact distance to the subject by using an active auto focusing method that uses infrared rays or ultrasonic waves. Alternatively, the exact distance may be input by the user. However, in consideration of the performance and economical efficiency of the apparatus, a passive auto focusing method that is based on the images captured by an image-capturing apparatus may be used. High pass filtering and a hill climbing search algorithm are representative examples. A detailed description thereof will be made below with reference to FIG. 5.

The blur levels are input S420. In order to correct the distance-calculating module 220, the distance-calculation-correcting module 240 receives the blur level B1 of the first image and the blur level B2 of the second image as data for the exact distance to the subject that is calculated by the precise distance-calculating module 230.

The correction is made on the basis of the input blur levels (S430). The distance-calculation-correcting module 240 corrects the distance-calculating module 220 on the basis of the exact distance to the subject that is calculated by the precise distance-calculating module 230 and the input blur levels B1 and B2. When a multilayer neural network is used as the distance-calculating module 220, the distance-calculation-correcting module 240 uses an online learning method to correct coefficients of the multilayer neural network such that an error of the distance-calculating module 220 is reduced as much as possible. A detailed description thereof will be made below with reference to FIGS. 8 and 9.

Figure 5:
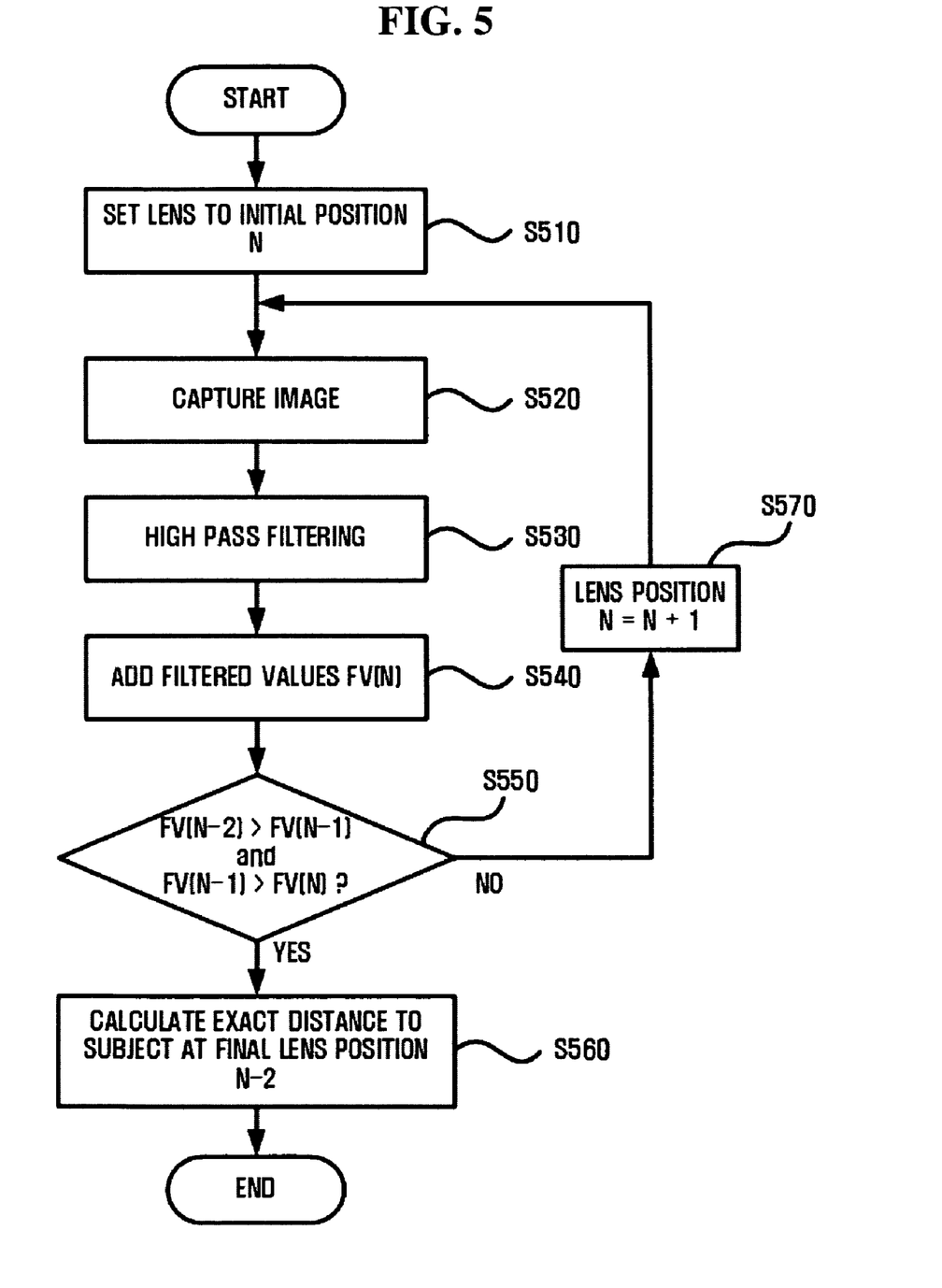
FIG. 5 is a flowchart illustrating a process of calculating the exact distance to a subject in the auto focusing apparatus according to an embodiment of the present invention.

FIG. 5 is a flowchart illustrating the operation of the auto focusing apparatus calculating the exact distance to a subject according to the embodiment of the present invention.

A lens is set at an initial position N (S510). The focal lens controller 150 positions the lens 110 at the initial position N. The value of the initial position N may be smaller than that of the position of the lens corresponding to the focal distance that is calculated by the distance-calculating module 220 of the auto focusing apparatus 140.

The sensor 120 captures an image at the set position S520.

High pass filtering is performed on the captured image (S530). In general, as the value obtained by the high pass filtering is greater, the clarity of an image increases. Therefore, the precise distance-calculating module 230 performs high pass filtering on the captured image.

The filtered values are added to calculate the value of FV(N) (S540). The precise distance-calculating module 230 adds all of the values obtained by performing high pass filtering on the image captured at the position N, and returns the value of FV(N).

It is determined whether a value of FV(N−2) is larger than a value of FV(N−1) and the value of FV(N−1) is larger than the value of FV(N) (S550). In most cases, the values subjected to the high pass filtering monotonically increase and decrease within a range of the position of the focal lens. By calculating a point where the value of FV(N) increases and then starts to decrease, the position of the focal lens that ensures the sharpest focus can be determined. Therefore, the precise distance-calculating module 230 determines whether the value of FV(N−2) is larger than the value of FV(N−1) and the value of the FV(N−1) is larger than the value of FV(N).

When the value of FV(N−2) is larger than the value of FV(N−1) and the value of FV(N−1) is larger than the value of FV(N), the values subjected to the high pass filtering start to decrease from N−1. Therefore, the exact distance to the subject is calculated at the position N−2 of the focal lens (S560). The precise distance-calculating module 230 calculates the distance to the subject at the position of the focal lens where the values subjected to the high pass filtering are the largest.

When the value of FV(N−2) is smaller than the value of FV(N−1) and the value of FV(N−1) is smaller than the value of FV(N), the position of the focal lens is moved to the next position N+1 (Step S570). The focal lens controller 150 moves the lens 110 to the next position N+1.

An image is captured at the position N+1, and then the above-described processes are repeated until the position of the lens where the values subjected to the high pass filtering are the largest is calculated.

Figure 6:
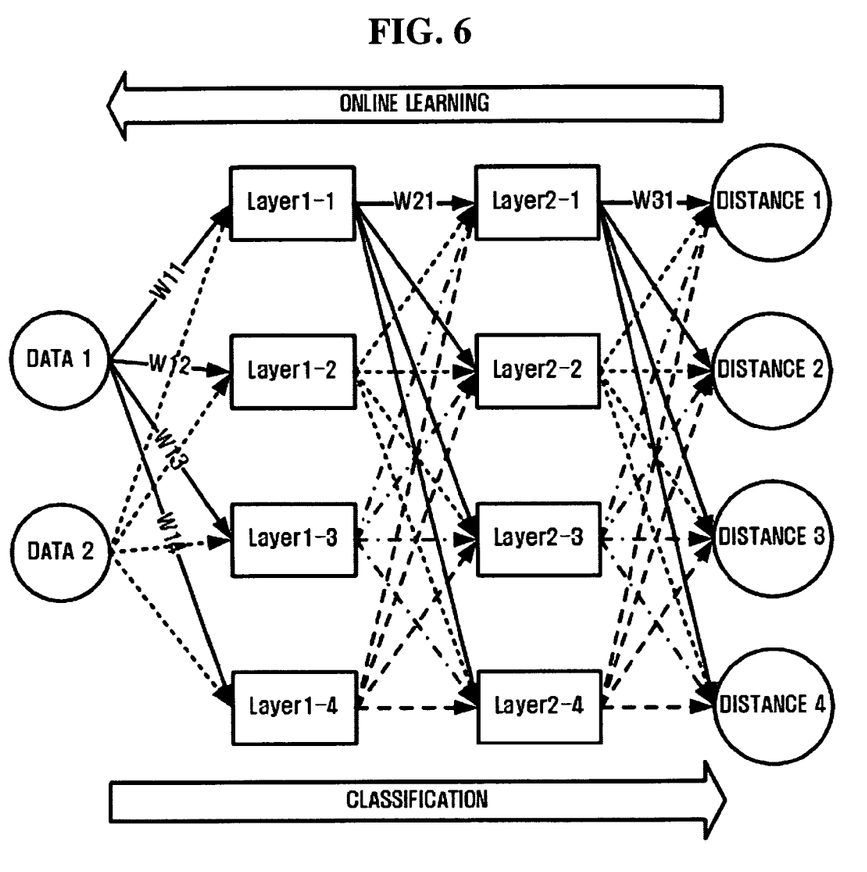
FIG. 6 is a diagram illustrating a multilayer neural network of a distance classifier in the auto focusing apparatus according to an embodiment of the present invention.

FIG. 6 is a diagram illustrating the multilayer neural network of the distance classifier in the auto focusing apparatus according to the embodiment of the present invention.

When there is blur level data for different focal distances according to an experiment, there is a need for a method of classifying the blur level data according to corresponding distances. Among the methods of classifying data, a multilayer neural network may be used. The multilayer neural network is well-established theoretically, and can be easily applied. Further, an error can be corrected and compensated by using a back propagation method.

For distance classification, as shown in FIG. 6, a triple-layer neural network that includes two inputs and four outputs is used. Output nodes are calculated according to a processing of calculating neurons. When the output node having the maximum value is selected among the output nodes, the focal distance with respect to the input blur level is calculated. A method of calculating each of the neurons will be described in detail with reference to FIG. 7.

Figure 7:
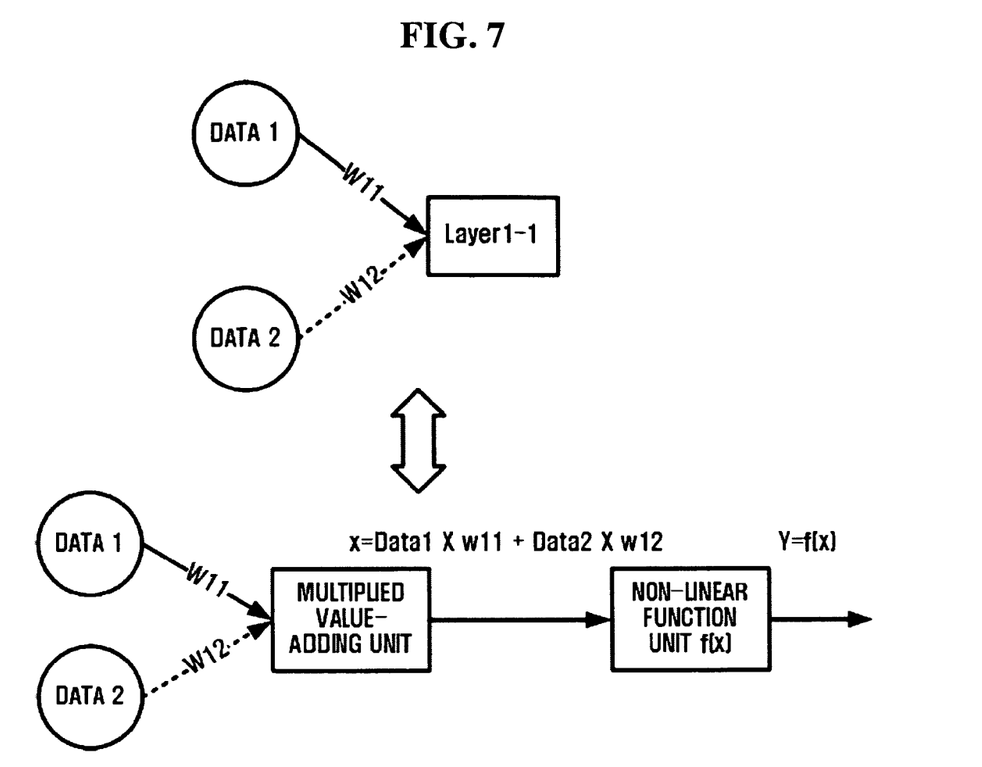
FIG. 7 is a diagram illustrating a process of calculating neurons in the multilayer neural network of the auto focusing apparatus according to an embodiment of the present invention.

FIG. 7 is a diagram illustrating a method of calculating neurons in the multilayer neural network of the auto focusing apparatus according to the embodiment of the present invention.

Each of the neurons includes two units. The first unit multiplies data 1 and a coefficient w11, and data 2 and a coefficient w21, and adds the two multiplied values. Here, the coefficients w11 and w12 are weights. This is represented by the following equation.

$$x = Data1 \times w11 + Data2 \times w12$$

The second unit realizes a non-linear function called an activation function. The following sigmoid function is used as the activation function.

$$f(x) = \frac{1}{1+e^{-x}}$$

Each of the neurons is calculated by using the above-described calculation method to calculate the output nodes. The maximum output node becomes the focal distance.

Figure 8:
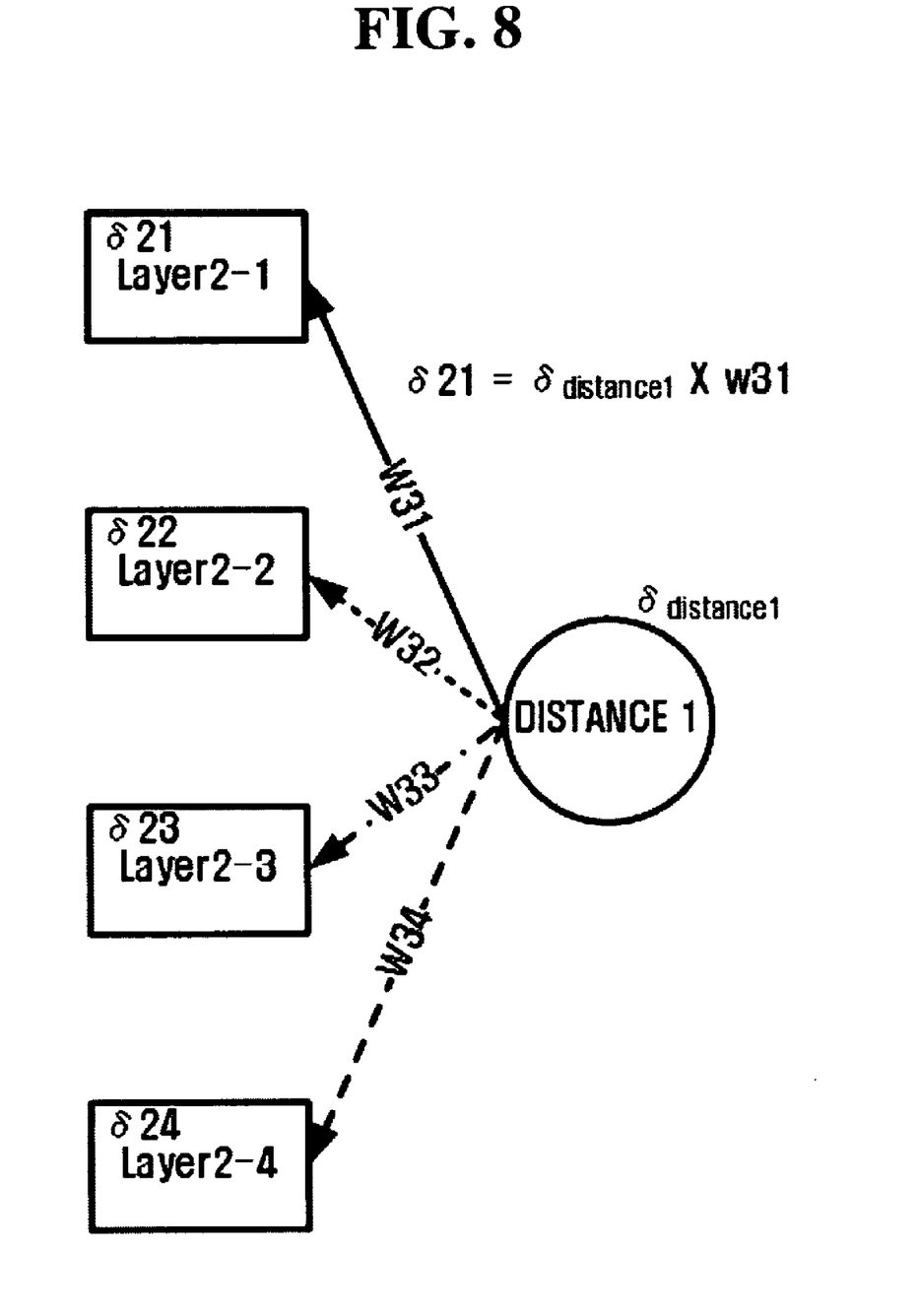
FIG. 8 is a diagram illustrating a back propagation process correcting coefficients of the multilayer neural network in the auto focusing apparatus according to an embodiment of the present invention.

FIG. 8 is a diagram illustrating a back propagation method of correcting a multilayer neural network in the auto focusing apparatus according to the embodiment of the present invention.

When an error is referred to as δ, an error with respect to distance 1 is δ. When the error with respect to the distance 1 is δ, an error δ21 with respect to a Layer 2-1 is as follows.

$$δ21 = δ \times w31$$

According to the back propagation method, errors δ11, δ12, δ13, and δ14 with respect to a first layer are calculated.

Figure 9:
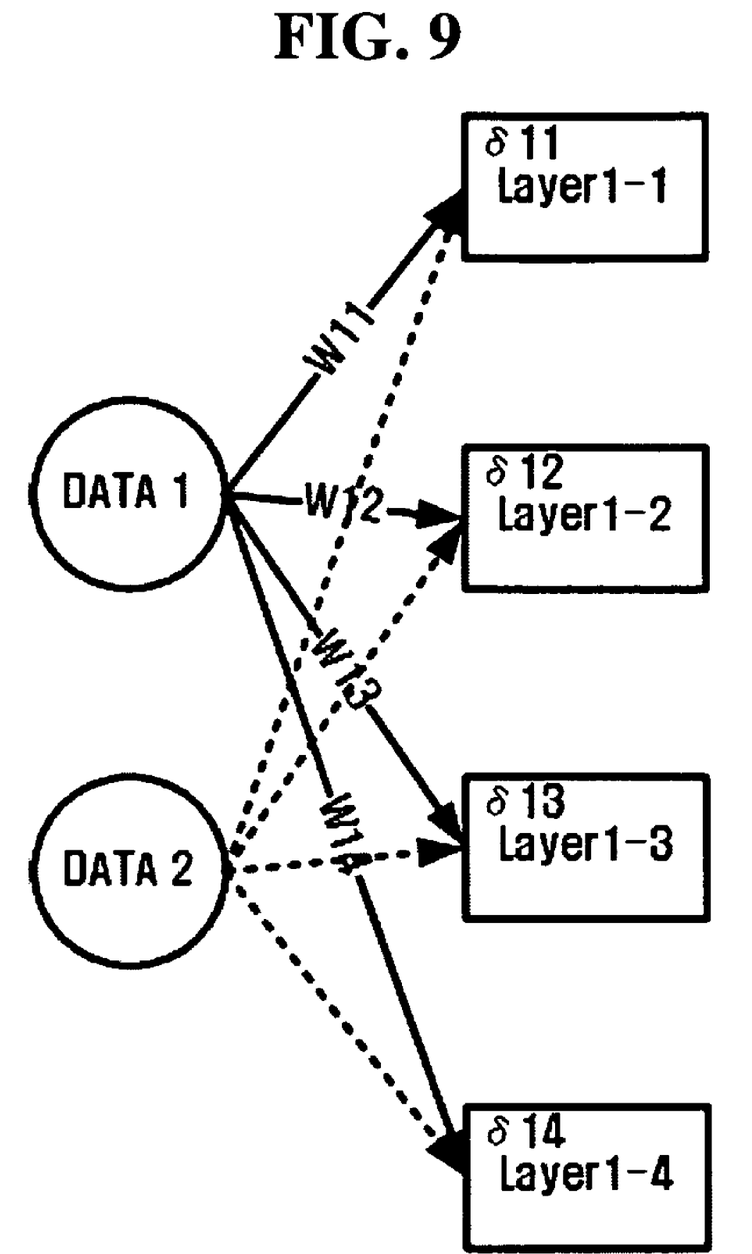
FIG. 9 is a diagram illustrating a process of correcting the coefficients of the multilayer neural network in the auto focusing apparatus according to an embodiment of the present invention.

FIG. 9 is a diagram illustrating a method of correcting the multilayer neural network in the auto focusing apparatus according to the embodiment of the present invention.

A coefficient that is corrected with respect to Layer 1-1 is calculated by the following equation.

$$w'11 = w11 + \eta \delta_{11} \frac{df(x_1)}{dx_1} x1$$

Here, η refers to a learning rate, f(x) refers to the above-described sigmoid function, and x1 refers to the value of data 1. Coefficients of the multilayer neural network are corrected according to the above-described method. While η and f(x) are maintained to have constant values, all of the coefficients are corrected to the final output node by using the above-described method.

As described above, the present invention has the following advantages. First, the focus can be quickly adjusted by using the least number of images. Second, self-correction can be made even when out of focus. Third, it is possible to effectively adjust the focus despite a quick scene change. Fourth, even though a large-scale data set is not previously constructed, precise focus can be obtained by real time correction.

Although an embodiment has been shown and described, it would be appreciated by those skilled in the art that changes may be made in this embodiment without departing from the principles and spirit of the invention, the scope of which is defined in the claims and their equivalents.

What is claimed is:

1. A distance classifier to auto focus, comprising:
   a distance-calculating module calculating a focal distance on the basis of blur levels of at least two images;
   a precise distance-calculating module calculating an exact distance to a subject when one of the images captured at the focal distance calculated by the distance-calculating module is out of focus; and
   a distance-calculation-correcting module correcting the distance-calculating module on the basis of the blur levels and the exact distance to the subject that is calculated by the precise distance-calculating module.

2. The distance classifier of claim 1, wherein:
   the distance-calculating module calculates the focal distance by using a multilayer neural network, and
   the distance-calculation-correcting module corrects coefficients of the multilayer neural network.

3. The distance classifier of claim 1, wherein the precise distance-calculating module calculates the exact distance by using a method that uses infrared rays or ultrasonic waves or a method that uses a high pass filter or a hill climbing search algorithm.

4. An apparatus to auto focus, comprising:
   a blur-level-calculating module calculating blur levels of at least two images that have different focal distances;
   a distance-calculating module calculating the focal distances on the basis of the blur levels that are calculated by the blur-level-calculating module;
   a precise distance-calculating module calculating the exact distance to a subject when one of the images captured at one of the focal distances calculated by the distance-calculating module is out of focus; and
   a distance-calculation-correcting module correcting the distance-calculating module on the basis of the blur levels and the exact distance to the subject that is calculated by the precision distance-calculating module.

5. The apparatus of claim 4, wherein the blur-level-calculating module calculates the blur levels by using at least one of the discrete cosine transform (DCT), Fourier transform (FT), Wavelet transform (WT), Laplacian filter, and Sobel filter.

6. The apparatus of claim 4, wherein:
   the distance-calculating module calculates the focal distance by using a multilayer neural network, and
   the distance-calculation-correcting module corrects coefficients of the multilayer neural network.

7. The apparatus of claim 4, wherein the precise distance-calculating module calculates the exact distance by using a method that uses infrared rays or supersonic waves, or a method that uses a high pass filter and a hill climbing search algorithm.

8. The apparatus of claim 4, wherein the blur-level-calculating module calculates the blur level of a first one of the two images that is captured at a first one of the focal distances and the blur level of a second one of the two images that is captured at a second one of the focal distances.

9. An image-capturing apparatus comprising:
   a lens on which image light of a subject is incident;
   a sensor capturing an image formed by the incident image light;
   an auto focusing apparatus calculating a focal distance by calculating a blur level of the image captured by the sensor, and correcting a method of calculating the focal distance when the image captured at the calculated focal distance is out of focus;
   a focal lens controller positioning the lens to adjust the focal distance according to the focal distance that is calculated by the auto focusing apparatus; and
   an image processor processing the image at the adjusted focal distance to form a final image.

10. The image-capturing apparatus of claim 9, wherein:
    the auto focusing apparatus comprises:
    a blur-level-calculating module calculating blur levels of at least two of the captured images that have different focal distances;
    a distance-calculating module calculating the focal distances on the basis of the blur levels that are calculated by the blur-level-calculating module;
    a precise distance-calculating module calculating an exact distance to the subject when one of the images that is captured at the focal distance calculated by the distance-calculating module is out of focus; and
    a distance-calculation-correcting module correcting the distance-calculating module on the basis of the blur levels and the exact distance to the subject that is calculated by the precision distance-calculating module.

11. The image-capturing apparatus of claim 10, wherein the blur-level-calculating module calculates the blur levels by using at least one of the discrete cosine transform (DCT), Fourier transform (FT), Wavelet transform (WT), Laplacian filter, and Sobel filter.

12. The image-capturing apparatus of claim 10, wherein:
    the distance-calculating module calculates the focal distances by using a multilayer neural network, and
    the distance-calculation-correcting module corrects coefficients of the multilayer neural network.

13. The image-capturing apparatus of claim 10, wherein the precise distance-calculating module calculates the exact distance by using a method that uses infrared rays or ultrasonic waves, or a method that uses a high pass filter and a hill climbing search algorithm.

14. An auto focusing method comprising:
    calculating a blur level of a first image that is captured at a first focal distance and a blur level of a second image that is captured at a second focal distance;
    calculating the first and focal distances on the basis of the blur level of the first image and the blur level of the second image; and
    correcting a method of calculating the focal distance when one of the captured images is out of focus.

15. The auto focusing method of claim 14, wherein the blur level is calculated by using at least one of the discrete cosine transform (DCT), Fourier transform (FT), Wavelet transform (WT), Laplacian filter, and Sobel filter.

16. The auto focusing method of claim 14, wherein:
the focal distance is calculated by using a multilayer neural network, and
the correction of the method of calculating the focal distance is performed by correcting coefficients of the multilayer neural network.

17. The auto focusing method of claim 14, further comprising:
calculating an exact distance to the subject when the image that is captured at the calculated focal distance is out of focus,
wherein the correction of the method of calculating the focal distance is performed on the basis of the exact distance to the subject, the blur level of the first image, and the blur level of the second image.

18. The auto focusing method of claim 17, wherein the exact distance to the subject is calculated by using a method that uses infrared rays or supersonic waves or a method that uses a high pass filter and a hill climbing search algorithm.

19. An image-capturing method comprising:
capturing images of a subject when image light is incident;
calculating blur levels of the captured images;
calculating a focal distance to the images on the basis of the calculated blur levels;
correcting a method of calculating the focal distance when one of the images that is captured at the calculated focal distance is out of focus; and
processing the captured image at the calculated focal distance to form a final image.

20. The method of claim 19, wherein the calculating the blur level comprises using at least one of the discrete cosine transform (DCT), Fourier transform (FT), Wavelet transform (WT), Laplacian filter, and Sobel filter.

21. The method of claim 19, wherein:
the calculating the focal distance comprises using a multilayer neural network, and
the correcting of the method of calculating the focal distance comprises correcting coefficients of the multilayer neural network.

22. The method of claim 19, further comprising:
calculating an exact distance to the subject when the image that is captured at the calculated focal distance is out of focus,
wherein the correction of the method of calculating the focal distance is performed on the basis of the exact distance to the subject and a blur level of a first image and a blur level of a second image.

23. A distance classifier to auto focus, comprising:
a distance-calculating module calculating a focal distance on the basis of blur levels of at least two images; and
a distance-calculation-correcting module correcting the distance-calculating module on the basis of the focal distance and the blur levels.

24. The distance classifier of claim 23, further comprising a precise distance-calculating module calculating an exact distance to a subject when one of the images captured at the focal distance calculated by the distance-calculating module is out of focus.

25. The distance classifier of claim 24, wherein the distance-calculation-correcting module corrects the distance-calculating module on the basis of the exact distance to the subject that is calculated by the precise distance-calculating module.

* * * * *